United States Patent Office 3,283,003
Patented Nov. 1, 1966

3,283,003
2-(N-LOWER ALKYL-N-CYCLOHEPTYL- AND CYCLOOCTYLAMINO)ETHYL GUANIDINES
David Jack, Gustard Wood, near Wheathampstead, Robert Geoffrey William Spickett, Harpenden, and Graham John Durant, St. Albans, all of England, assignors, by mesne assignments, to Smith Kline & French Laboratories, Philadelphia, Pa., a corporation of Pennsylvania
No Drawing. Filed Dec. 19, 1961, Ser. No. 160,627
Claims priority, application Great Britain, Dec. 23, 1960, 44,284/60
5 Claims. (Cl. 260—564)

This invention relates to new guanidine derivatives having pharmacological activity. In particular the compounds of this invention are blockers of the peripheral sympathetic nervous system and hypotensive agents. In addition certain of the compounds of this invention have useful diuretic activity.

The new guanidine derivatives of this invention are represented in their free base form by the following general structural formula:

*Formula I*

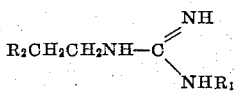

wherein:

$R_1$ is hydrogen or amino, and
$R_2$ is N-lower alkyl-cycloheptylamino, N-lower alkyl-cyclooctylamino or, when $R_1$ is amino, hexahydro-1-azepinyl or octahydro-1-azocinyl.

The term "lower alkyl" as used herein denotes groups having 1–4 carbon atoms, preferably methyl.

The compounds of this invention in which $R_1$ of Formula I above is hydrogen are represented by the following formula:

*Formula II*

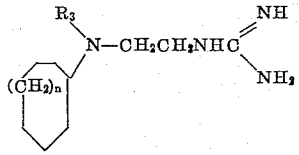

in which $n$ is an integer of from 1 to 2 and $R_3$ is lower alkyl.

The preferred compounds of this invention are those of Formula I in which $R_1$ is amino and are represented by the following formulas:

*Formula III*

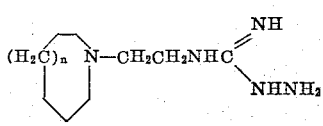

*Formula IV*

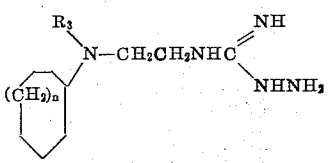

in which $n$ is an integer of from 1 to 2 and $R_3$ is lower alkyl.

The compounds of Formula IV are advantageous.

This invention also includes pharmaceutically acceptable salts of the above defined bases formed with non-toxic organic or inorganic acids. Suitable organic acids are, for example, maleic, fumaric, ascorbic, acetic, citric, methanesulfonic, ethanedisulfonic and benzene sulfonic. Exemplary of the preferred inorganic salts are those with hydrochloric, hydrobromic, hydriodic, phosphoric or sulfuric acids. The compounds of this invention can be isolated as their inorganic salts. A salt can be converted into the free base by treatment of a solution of the salt in ethanol with an excess of a base such as sodium ethoxide. The free base can be converted into other pharmaceutically acceptable, nontoxic, acid addition salts by treating with the appropriate organic or inorganic acid advantageously in a solvent such as ethanol, ether, acetone or ethyl acetate.

The guanidine derivatives of this invention are prepared according to the following procedure:

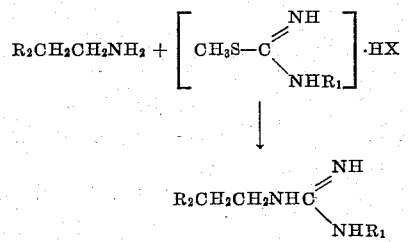

HX is a mineral acid such as sulfuric or hydriodic acid. The terms $R_1$ and $R_2$ are as defined hereabove.

The 2-substituted-ethylamine starting material is reacted with an S-methyl-isothiouronium salt such as, preferably, the sulfate salt or an S-methyl-isothiosemicarbazide salt such as, preferably, the hydriodide salt. The reaction is conveniently carried out in an aqueous solvent, advantageously in aqueous ethanol or methanol, at elevated temperature, such as at the reflux temperature of the reaction mixture for from about 5 to about 24 hours.

The ethylamine starting materials are either known to the art or can be prepared by treatment of the corresponding secondary amine with chloroacetonitrile in the presence of anhydrous potassium carbonate and by reducing the resulting aminoacetonitrile with lithium aluminum hydride as follows:

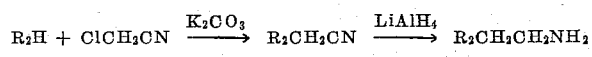

The term $R_2$ is as defined hereabove.

The following examples are not limiting but will serve to illustrate the compounds of this invention and the processes for their preparation.

*Example 1*

To a solution of 13.65 g. of S-methyl-isothiosemicarbazide hydriodide in ethanol (100 ml.) is added 2-(hexahydro-1-azepinyl)ethylamine (10.0 g.) and the reaction mixture is heated under reflux for 18 hours. The solution is concentrated in vacuo to low volume (20 ml.) and set aside in the cold for two hours. The solid deposited is recrystallized from iso-propanol affording N-amino-N'-[2-(hexahydro-1-azepinyl)-ethyl]-guanidine hydriodide, M.P. 97–98° C.

*Example 2*

N-methylcycloheptylamine (15 g.) is dissolved in dry toluene (100 ml.) and treated with chloroacetonitrile (10.7 g.) in the presence of anhydrous potassium carbonate (36.2 g.) with stirring. The mixture is heated under reflux for 24 hours, cooled, filtered and the filtrate dried over potassium carbonate. After concentration under reduced pressure, the residue is distilled affording N-methyl-N-cycloheptylaminoacetonitrile, B.P. 74–77° C./0.4 mm.

Ten grams of N-methyl-N-cycloheptylaminoacetonitrile in dry ether (50 ml.) is added to a slurry of lithium aluminum hydride (2.7 g.) in dry ether (200 ml.) with cooling and stirring. Stirring is continued for 1.5 hours at room temperature and in succession is added wet ether (50 ml.), water (5 ml.), 20% sodium hydroxide (15 ml.) and water (15 ml.). After filtration, the filtrate is dried over potassium carbonate and concentrated. The residual oil is distilled affording 2-(N-methyl-N-cycloheptylamino)ethylamine, B.P. 60° C./0.15 mm.

To a solution of 4.45 g. S-methyl-isothiourea sulfate in ethanol (200 ml.), 2-(N-methyl-N-cycloheptylamino) ethylamine (5 g.) is added. The mixture is heated under reflux for 20 hours and then cooled. The solid deposited is filtered and recrystallized from isopropanol to give 2-(N-methyl-N-cycloheptylamino)ethyl guanidine sulfate, M.P. 230° C. (decomp.).

An ethanol solution of the sulfate salt is treated with a solution of sodium ethoxide in ethanol. Filtration and evaporation gives the free base 2-(N-methyl-N-cycloheptylamino)ethyl guanidine.

The free base in ethanol is treated with an excess of ethereal hydrogen chloride to give 2-(N-methyl-N-cycloheptylamino)ethyl guanidine hydrochloride.

Example 3

N-methylcyclooctylamine (17.0 g.) is dissolved in dry toluene (200 ml.) and anhydrous potassium carbonate (35 g.) is added. Chloroacetonitrile (10 g.) is slowly added with stirring, and the mixture is stirred and refluxed for 20 hours. After filtration and washing of the inorganic solids with dry benzene, the filtrate is concentrated under reduced pressure and the residue is distilled under high vacuo to give N-methyl-N-cyclooctylaminoacetonitrile.

The nitrile (16.3 g.) is added dropwise to a slurry of lithium aluminum hydride (3.9 g.) in dry ether (100 ml.) with cooling and stirring. After addition, stirring is continued for two hours at room temperature and then refluxed for 1.5 hours. Water (4 ml.), 20% sodium hydroxide (12 ml.) and water (12 ml.) are added successively with cooling and stirring and after one hour at room temperature the white solid is filtered and washed with ether. The combined filtrate is dried over potassium carbonate. After concentration under reduced pressure the residue is distilled, affording 2-(N-methyl-N-cyclooctylamino)ethylamine, B.P. 75–76° C./0.1 mm.

2 - (N - methyl - N - cyclooctylamino)ethylamine (6 g.) is added to a solution of S-methylthiourea sulfate (4.6 g.) in aqueous ethanol (50 ml.). The mixture is heated under reflux for 18 hours and then concentrated under reduced pressure to about half volume. On cooling and addition of ether a solid is deposited which is recrystallized from aqueous ethanol to give 2-(N-methyl-N-cyclooctylamino) ethyl guanidine sulfate.

Example 4

2-(octahydro-1-azocinyl)ethylamine (5.5 g.) dissolved in ethanol (20 ml.) is added to a solution of S-methyl-isothiosemicarbazide hydriodide (6.9 g.) in ethanol (80 ml.). The solution is heated under reflux for 20 hours and then concentrated in vacuo to 100 ml. The solution is filtered and to the resulting filtrate is added anhydrous ether until a slight permanent turbidity is produced. The solution is cooled in an ice bath and the solid which crystallizes out is filtered. Recrystallization from isopropanol-ether affords white needles of N-amino-N'-2-(octahydro-1-azocinyl)ethyl guanidine hydriodide, M.P. 117–122° C.

Example 5

A mixture of 5.0 g. of 2-(N-methyl-N-cycloheptylamino)ethylamine, 5.5 g. of S-methyl-isothiosemicarbazide hydriodide and 100 ml. of ethanol is refluxed for 16 hours. Working up as in Example 4 gives N-amino-N'-2-(N-methyl-N-cycloheptylamino)ethyl guanidine hydriodide.

Similarly reacting 2 - (N - methyl-N-cyclooctylamino) ethylamine with S-methyl-isothiosemicarbazide hydriodide yields N-amino-N'-2-(N-methyl-N-cyclooctylamino)ethyl guanidine hydriodide.

An ethanol solution of the hydriodide salt is treated with a solution of sodium ethoxide in ethanol. Filtration and evaporation gives N-amino-N'-2-(N-methyl-N-cyclooctylamino)ethyl guanidine. A sample of the free base in ethyl acetate is treated with an equimolar amount of maleic acid to give N-amino-N'-2-(N-methyl-N'-cyclooctylamino)ethyl guanidine maleate.

Example 6

A mixture of 6.5 g. of cycloheptanone, 4.0 g. of n-butylamine, 0.03 ml. of concentrated hydrochloric acid in 35 ml. of methanol is hydrogenated with platinum oxide catalyst at room temperature for 36 hours. After filtering, concentrating and distilling N-butyl-cycloheptylamine is obtained.

Five grams of N-butyl-cycloheptylamine in toluene is treated with chloroacetonitrile in the presence of potassium carbonate and the resulting N-butyl-N-cycloheptylamino acetonitrile is reduced with lithium aluminum hydride as in Example 2 to give 2-(N-butyl-N-cycloheptylamino)ethylamine.

A mixture of 2.5 g. of 2-(N-butyl-N-cycloheptylamino) ethylamine and 2.0 g. of S-methylthiourea sulfate in ethanol is heated at reflux for 20 hours. On cooling and filtering 2-(N-butyl-N-cycloheptylamino)ethyl guanidine sulfate is obtained.

Example 7

An ethanol solution of 10.0 g. of 2-(N-butyl-N-cycloheptylamino)ethylamine, prepared as in Example 6, and 13.0 g. of S-methyl-isothiosemicarbazide hydriodide is refluxed for 18 hours. The mixture is concentrated, cooled and filtered to give N-amino-N'-[2-(N-methyl - N - cycloheptylamino)ethyl]guanidine hydriodide.

What is claimed is:

1. A chemical compound selected from the group consisting of compounds having the following formula:

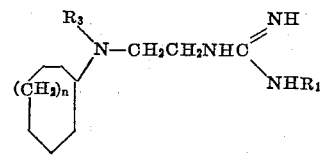

in which:
  $R_1$ is a member selected from the group consisting of hydrogen and amino;
  $R_3$ is lower alkyl; and
  $n$ is an integer of from 1 to 2;
and nontoxic, pharmaceutically acceptable, acid addition salts thereof.

2. A chemical compound having the formula:

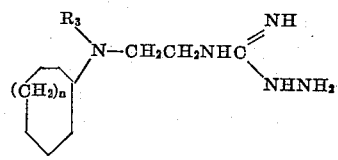

in which $n$ is an integer of from 1 to 2 and $R_3$ is lower alkyl.

3. A chemical compound having the formula:

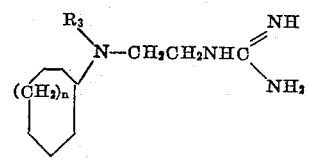

in which $n$ is an integer of from 1 to 2 and $R_3$ is lower alkyl.

4. A chemical compound having the formula:
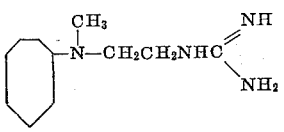
5. A chemical compound having the formula:
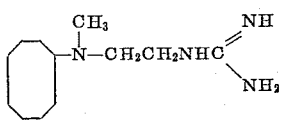
References Cited by the Examiner
UNITED STATES PATENTS
| | | | |
|---|---|---|---|
| 2,897,195 | 7/1959 | Mull | 260—239 |
| 2,928,829 | 3/1960 | Mull | 260—239 |
| 3,006,913 | 10/1961 | Mull | 260—239 |
| 3,055,882 | 9/1962 | Mull | 260—239 |
OTHER REFERENCES
Mull: J. Org. Chem., vol 25, pp. 1953–1956 (1959).
CHARLES B. PARKER, *Primary Examiner.*
IRVING MARCUS, *Examiner.*
J. T. MILLER, F. D. HIGEL, *Assistant Examiners.*